US007715447B2

(12) United States Patent
Lam et al.

(10) Patent No.: US 7,715,447 B2
(45) Date of Patent: May 11, 2010

(54) METHOD AND SYSTEM FOR TONE DETECTION

(75) Inventors: Sui Lam, WoodCliff Lake, NJ (US); Kai Miao, Boonton Township, NJ (US); Amin Rhemtulla, Rockaway, NJ (US)

(73) Assignee: Intel Corporation, Santa Clara, CA (US)

( * ) Notice: Subject to any disclaimer, the term of this patent is extended or adjusted under 35 U.S.C. 154(b) by 1531 days.

(21) Appl. No.: 10/746,900

(22) Filed: Dec. 23, 2003

(65) Prior Publication Data

US 2005/0135431 A1  Jun. 23, 2005

(51) Int. Cl.
*H04J 3/12* (2006.01)
*H04M 11/00* (2006.01)
(52) U.S. Cl. ............... 370/526; 379/93.01; 379/142.18
(58) Field of Classification Search .......... 370/526, 370/480, 487, 493–496, 509, 510, 525, 229–232, 370/252, 253, 389, 400, 401, 412, 413, 415, 370/417; 379/90.01, 93.01, 142.18, 235, 379/386; 375/316, 334, 342, 359, 360, 362
See application file for complete search history.

(56) References Cited

U.S. PATENT DOCUMENTS

| | | | | |
|---|---|---|---|---|
| 5,809,133 A * | 9/1998 | Bartkowiak et al. | ......... | 379/386 |
| 6,035,179 A | 3/2000 | Virtanen | | |
| 6,046,977 A * | 4/2000 | Bartkowiak | ........ | 370/503 |
| 6,370,555 B1 * | 4/2002 | Bartkowiak | ........ | 708/311 |
| 6,711,540 B1 * | 3/2004 | Bartkowiak | ........ | 704/226 |
| 6,763,106 B1 * | 7/2004 | Li et al. | ........ | 379/386 |
| 6,873,701 B1 * | 3/2005 | Tian et al. | ........ | 379/386 |
| 6,993,101 B2 * | 1/2006 | Trachewsky et al. | ........ | 375/343 |
| 7,024,357 B2 * | 4/2006 | Bartkowiak | ........ | 704/226 |
| 7,184,542 B2 * | 2/2007 | Sauvage et al. | ........ | 379/386 |
| 7,257,165 B2 * | 8/2007 | Gardner | ........ | 370/516 |
| 2003/0123574 A1 * | 7/2003 | Simeon et al. | ........ | 370/526 |
| 2005/0058273 A1 * | 3/2005 | Lam et al. | ........ | 379/386 |

FOREIGN PATENT DOCUMENTS

EP    1335614 A1    8/2003

OTHER PUBLICATIONS

Tone Detection Process, IBM Technical Disclosure Bulletin, Jul. 1995, vol. 38, No. 07, Armonk, N.Y., US.
First Office Action for Chinese Patent Application No. 200480038724.X mailed Apr. 3, 2009, 4 pgs.

* cited by examiner

*Primary Examiner*—Aung S Moe
*Assistant Examiner*—Kerri M Rose
(74) *Attorney, Agent, or Firm*—Blakely, Sokoloff, Taylor & Zafman LLP

(57) ABSTRACT

Tone detection includes receiving a series of frames having a signal containing a tone and locating a first frame in the series of frames in which there is at least a partial, tone. The signal energy of the first frame may then be compared to the signal energy of a full tone frame or compared to the signal energy of a frame. A start time of the tone in the signal may then be determined. An end time of the tone in the signal may be determined by locating a last frame in the series of frames. The duration of the tone signal may be determined based on the determined start time and end time of the tone in the signal.

22 Claims, 4 Drawing Sheets

METHOD AND SYSTEM FOR TONE DETECTION

BACKGROUND

1. Technical Field

Embodiments of the invention relate to the field of IP telephony applications, and more specifically to tone detection.

2. Background Information and Description of Related Art

In current telephony applications, the presence of standardized tones needs to be detected and transmitted. When data transmission is required over a packet network, such as Voice Over IP, tone detection is done on a frame-by-frame basis, usually at the same rate as the frame rate of a voice codec. Since the start and end of tones are not synchronous with voice frame rates, the time representation of the start, end, and duration of tone is not accurate. For example, for a frame rate of 10 ms, the tone start and end point is represented in increments of 10 ms. This may cause the tone duration representation to deviate from its real value by more than 10 ms. Since the duration of a tone is an important criterion in the detection and classification of a tone, this deviation may result in the inaccuracy of tone detection and distort tone cadence information.

BRIEF DESCRIPTION OF DRAWINGS

The invention may best be understood by referring to the following description and accompanying drawings that are used to illustrate embodiments of the invention. In the drawings.

DETAILED DESCRIPTION

Embodiments of a system and method for tone detection are described. In the following description, numerous specific details are set forth. However, it is understood that embodiments of the invention may be practiced without these specific details. In other instances, well-known circuits, structures and techniques have not been shown in detail in order not to obscure the understanding of this description.

Reference throughout this specification to "one embodiment" or "an embodiment" means that a particular feature, structure, or characteristic described in connection with the embodiment is included in at least one embodiment of the invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
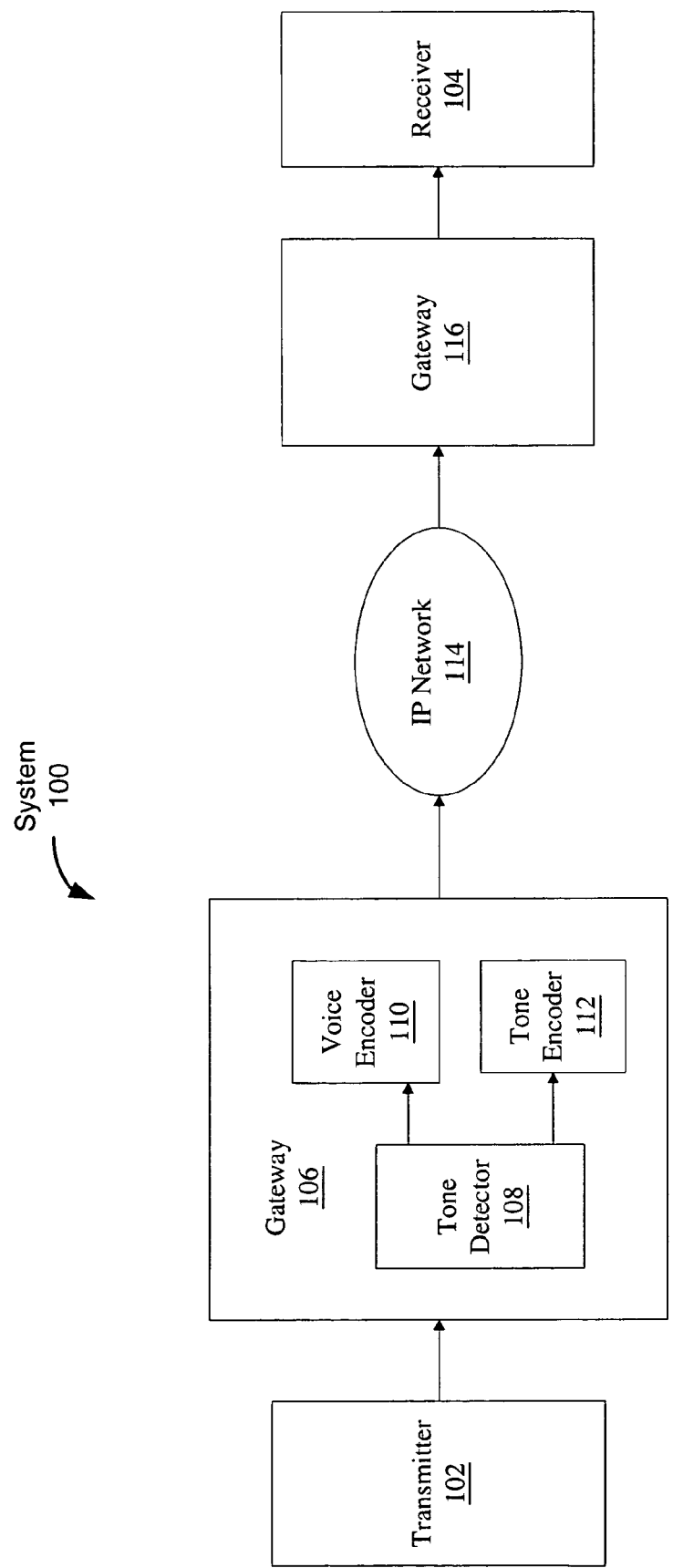
FIG. 1 is a block diagram illustrating one generalized embodiment of a system incorporating the invention.

Referring to FIG. 1, a block diagram illustrates a system 100 according to one embodiment of the invention. Those of ordinary skill in the art will appreciate that the system 100 may include more components than those shown in FIG. 1. However, it is not necessary that all of these generally conventional components be shown in order to disclose an illustrative embodiment for practicing the invention.

System 100 includes an IP network 114, a transmitter 102 connected to IP network 114 via gateway 106, and a receiver 104 connected to IP network 114 via gateway 116. The gateway 106 includes a tone detector 108 to detect whether signals received from the transmitter are tone signals. If the received signals are determined to be tone signals, they are encoded by a tone encoder 112 before being transmitted to IP network 114. If the received signals are determined to be voice signals, they are encoded by a voice encoder 110 before being transmitted to IP network 114. The tone or voice signals may then be transmitted from IP network 114 to receiver 104 via gateway 116.

The tone detector 108 may use one of a variety of tone detection algorithms, such as Fast Fourier Transforms (FFT) or filter bank analysis, to detect a tone in a received signal. These algorithms typically analyze the received signal by determining the energy and frequency of the signal. The signal's energy and frequency are then compared with the energy and frequency of various tones in predefined tone templates to identify a tone, if any, in the signal. Therefore, after a tone has been detected in the signal, the average energy level of each frame of the tone signal may already have been determined.

For the middle frames of the tone signal, the average energy is relatively stable and may be determined by the amplitude of the signal. However, the tone does not always begin and end at the beginning or end of a frame. Therefore, the first frame and last frame of the tone signal may have an average energy that is smaller than the average energy of the middle frames, due to the tone occurring in only part of the frame.

The level of the average energy of a frame should be proportional to the duration of the tone within that frame. Therefore, to estimate the time duration of the tone within a first frame of a tone signal, a ratio of the average energy of the first frame to the average energy of a full tone frame may be used. In one embodiment, the time duration of the tone within a first frame of a tone signal may be estimated by using a ratio of the average energy of the first frame to the average energy of a middle frame. Similarly, to estimate the time duration of the tone within a last frame of a tone signal, a ratio of the average energy of the last frame to the average energy of a full tone frame or middle frame may be used. In one embodiment, a lookup table that maps energy ratios to actual time duration may be used to determine the time duration of a tone within a first frame or a last frame.

By determining and storing the average energies of each frame of a tone signal and performing the division and/or table lookup described above, the time duration of the tone within a first frame and a last frame of a tone signal may be determined, providing a more accurate and precise starting time, ending time, and total time duration of a tone in a tone signal.

Figure 2:
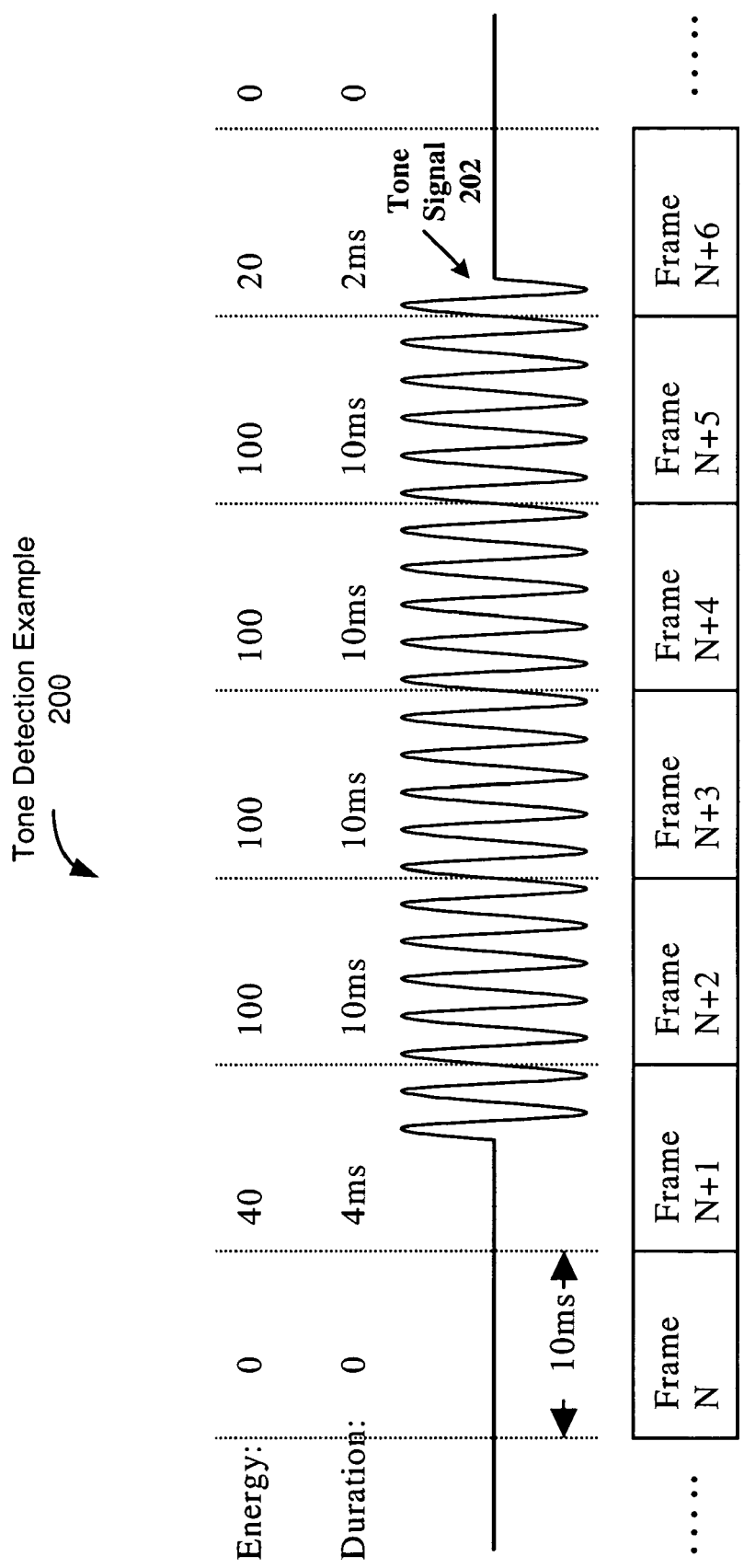
FIG. 2 is a diagram illustrating a tone detection example according to an embodiment of the invention.

FIG. 2 is a diagram illustrating a tone detection example with an exemplary tone signal 202 according to one embodiment of the invention. In this example, the tone occurs in six frames (N+1 through N+6), and the frame rate is 10 ms. Various other frame rates may be used with the invention, including but not limited to 20 ms, 40 ms, or 60 ms. The tone detector may use one of a number of tone detection algorithms, as discussed above, to determine whether the received signal 202 is a tone signal. The energy and frequency of the signal 202 will be analyzed and compared to the energy and frequency of one or more tones in one or more predefined tone templates. This comparison will determine whether there is a tone present in the signal 202. If a tone is not detected in signal 202, the signal 202 may be sent to the voice encoder 110 to be encoded before being transmitted to the receiver 104. If a tone is detected in signal 202, further analysis may be done to determine the beginning, end, and duration of the tone. The average energy of each frame of the signal 202 may be stored according to frequency bins for the beginning, middle, and end of the tone. This average energy may have already been determined during the tone detection analysis.

To find the beginning of the tone, the location of the first frame of the tone signal in which at least a partial tone is present is located. The tone detection analysis, described above, may have determined a beginning frame and ending frame of the tone signal. This determined beginning frame and ending frame may or may not be accurate. For instance, in the example shown in FIG. 2, the tone detection analysis may have determined that the tone begins in frame N+2 and ends in frame N+5. The inaccurate determination may be caused by frames N+1 and N+6 not containing enough tone for recognition by the detection analysis.

In one embodiment, the location of the beginning of the tone may be determined by examining the beginning frame provided by the tone detection analysis and comparing the average energy of this frame against the average energy of a subsequent frame and/or a preceding frame. For example, suppose that the tone detection analysis has determined that frame N+2 is the beginning frame of tone. The average energy of frame N+2 is 100. The average energy of the next frame (N+3) is 100. The ratio of these average energies is 1. Since the average energy of each of the middle frames of a tone signal represents the average energy of a full tone frame, this ratio of 1 indicates that both frame N+2 and frame N+3 are full tone frames. Therefore, there may be a frame before frame N+2 that has a partial tone and contains the actual beginning of the tone. The frame N+1 is therefore analyzed. The average energy of frame N+1, which is 40, is compared to the average energy of frame N+2, which is 100. The ratio of average energies is therefore 4/10. This indicates that frame N+1 is a partial frame tone and contains the beginning of the tone. To determine the starting time of the beginning of the tone, the ratio of 4/10 is used to lookup the actual time duration. Since the level of average energy of a frame should be proportional to the duration of the tone within that frame, a ratio of 4/10 for a frame rate of 10 ms indicates that there is 4 ms of tone in frame N+1.

In another example, if the tone detection analysis had determined N+1 as the beginning frame of tone, the ratio of the average energy of frame N+1 to the average energy of frame N+2, which is 4/10, would indicate that N+1 is a partial tone frame and contains the beginning of the tone. Therefore, the analysis of a preceding frame (e.g. frame N) would not be needed.

The location of the end of the tone may be determined in a similar manner. For example, suppose that the tone detection analysis determines that frame N+5 is the end frame. The average energy of frame N+5 is 100. This average energy is compared to the average energy of a preceding frame (e.g. N+4), which is 100. The ratio of the average energies is 1. This indicates that both N+4 and N+5 are full tone frames. Therefore, a subsequent frame needs to be analyzed. Frame N+6 has an average energy of 20. The ratio of the average energy of frame N+6 to the average energy of frame N+5 is 2/10. This indicates that frame N+6 is a partial tone frame and contains the end of the tone. The ratio of 2/10 for a frame rate of 10 ms indicates that frame N+6 contains 2 ms of tone.

After a more precise beginning and end of the tone are determined via the process described above, a more precise total duration of the tone may be determined. In the example of FIG. 2, since there are four full tone frames (N+2 to N+5), each with 10 ms of tone, a beginning partial frame with 4 ms of tone, and an ending partial frame with 2 ms of tone, the total duration of the tone is 46 ms.

Figure 3:
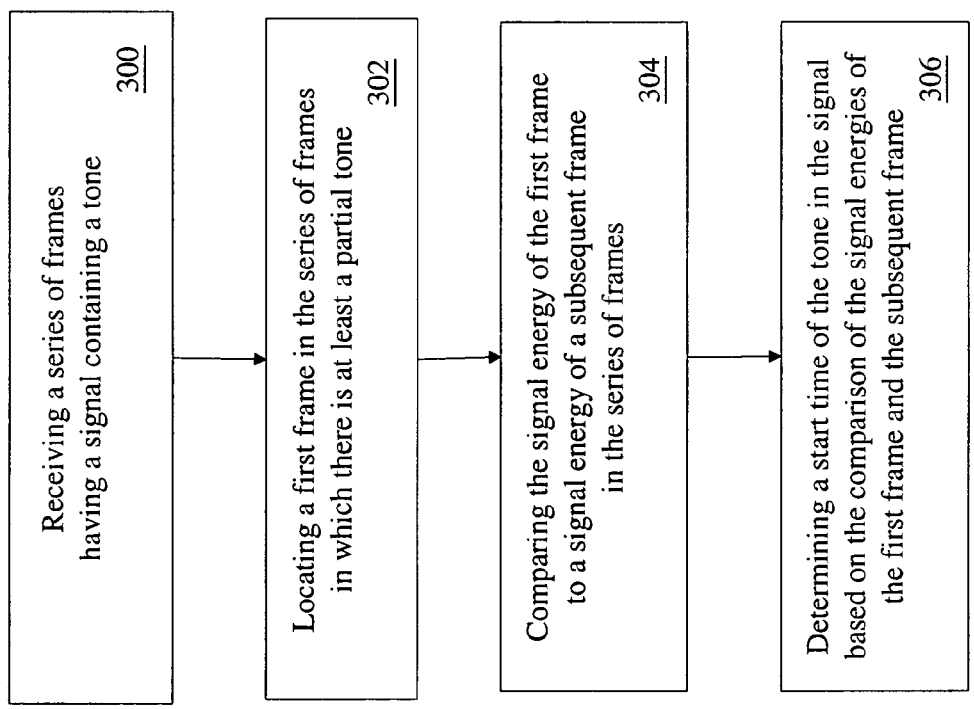
FIG. 3 is a flow diagram illustrating a method according to an embodiment of the invention.

FIG. 3 illustrates a method according to one embodiment of the invention. At 300, a series of frames having a signal containing a tone are received. At 302, a first frame in the series of frames in which there is at least a partial tone is located. At 304, the signal energy of the first frame is compared to the signal energy of a subsequent frame in the series of frames. In one embodiment, this comparison may be done by using a ratio of the signal energy of the first frame to the signal energy of a subsequent frame in the series of frames. In one embodiment, the ratio may be multiplied by the frame rate to determine a duration of the tone in the first frame. In one embodiment, the ratio may be used to perform a table lookup that maps energy ratios to time duration. At 306, a start time of the tone in the signal is determined based on the comparison of the signal energies of the first frame and the subsequent frame. In one embodiment, a last frame in the series of frames in which there is at least a partial tone is located. The signal energy of the last frame may then be compared to the signal energy of a preceding frame in the series of frames. The end time of the tone in the signal may then be determined based on the comparison of the signal energies of the last frame and the preceding frame. In one embodiment, a duration of the tone may be determined based on the determined start time and end time of the tone in the signal.

Figure 4:
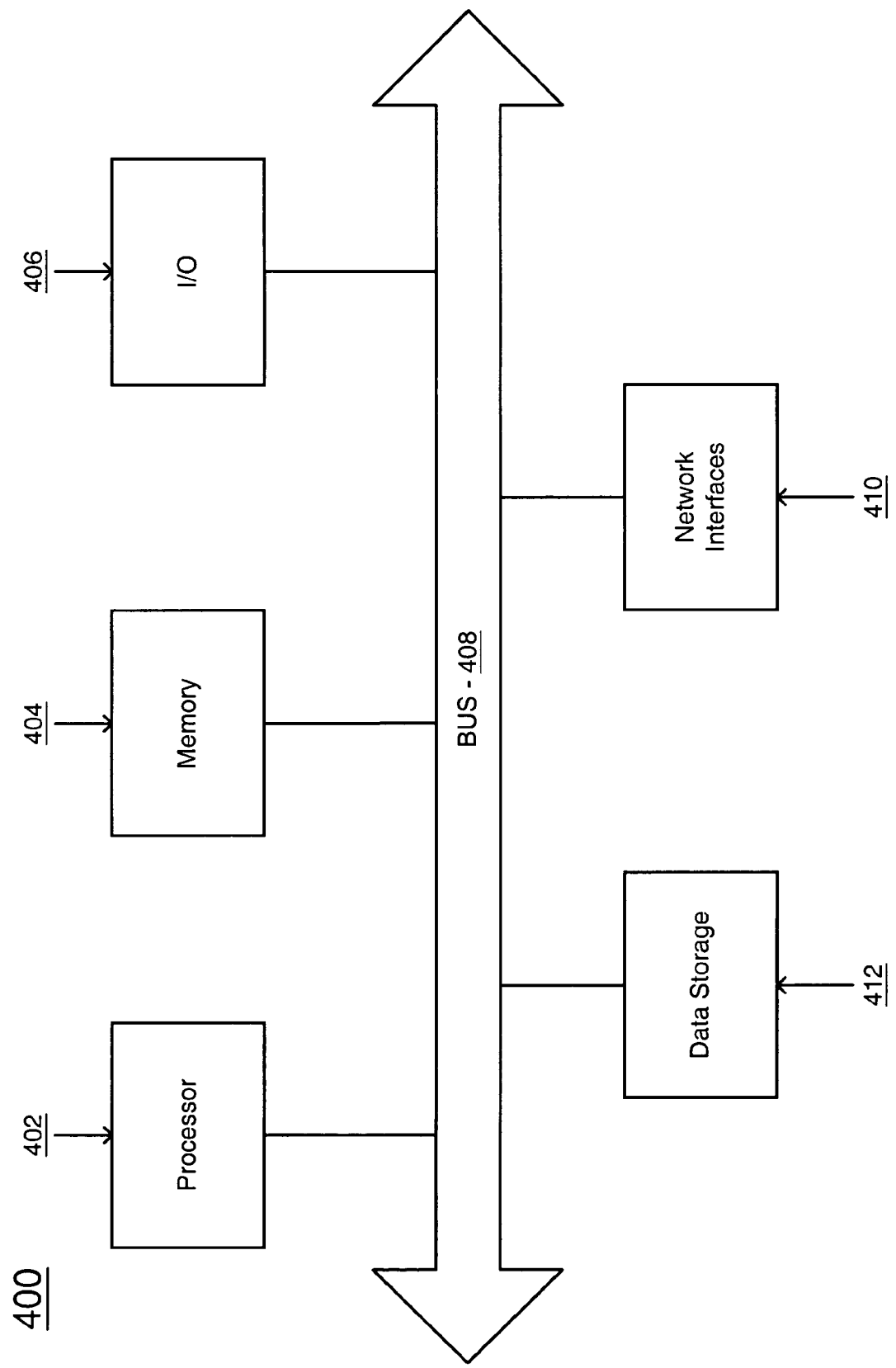
FIG. 4 is a block diagram illustrating a suitable computing environment in which certain aspects of the illustrated invention may be practiced.

FIG. 4 is a block diagram illustrating a suitable computing environment in which certain aspects of the illustrated invention may be practiced. In one embodiment, the method described above may be implemented on a computer system 400 having components 402-412, including a processor 402, a memory 404, an Input/Output device 406, a data storage device 412, and a network interface 410, coupled to each other via a bus 408. The components perform their conventional functions known in the art and provide the means for implementing the system 100. Collectively, these components represent a broad category of hardware systems, including but not limited to general purpose computer systems and specialized packet forwarding devices. It is to be appreciated that various components of computer system 400 may be rearranged, and that certain implementations of the present invention may not require nor include all of the above components. Furthermore, additional components may be included in system 400, such as additional processors (e.g., a digital signal processor), storage devices, memories, and network or communication interfaces.

As will be appreciated by those skilled in the art, the content for implementing an embodiment of the method of the invention, for example, computer program instructions, may be provided by any machine-readable media which can store data that is accessible by system 100, as part of or in addition to memory, including but not limited to cartridges, magnetic cassettes, flash memory cards, digital video disks, random access memories (RAMs), read-only memories (ROMs), and the like. In this regard, the system 100 is equipped to communicate with such machine-readable media in a manner well-known in the art.

It will be further appreciated by those skilled in the art that the content for implementing an embodiment of the method of the invention may be provided to the system 100 from any external device capable of storing the content and communicating the content to the system 100. For example, in one embodiment of the invention, the system 100 may be connected to a network, and the content may be stored on any device in the network.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting.

What is claimed is:

1. A method comprising:
   receiving a series of Voice Over Internet Protocol frames having a signal containing a tone, wherein the series of frames has a frame rate of a voice codec and the tone has an associated energy and frequency;
   comparing the energy and the frequency of the tone in a selected frame to one or more templates of energies and frequencies of possible tones;
   analyzing an immediately previous frame to locate a first frame in the series of frames in which there is at least a partial tone in response to the comparison indicating a possible tone in the selected frame;
   comparing the signal energy of the immediately previous frame in which there is at least a partial tone to a signal energy of the selected frame in the series of frames to estimate a time duration of the tone in the first frame; and
   determining a start time of the tone in the signal based on the comparison of the signal energies of the first frame and the subsequent frame.

2. The method of claim 1, further comprising locating a last frame in the series of frames in which there is at least a partial tone.

3. The method of claim 2, further comprising comparing the signal energy of the last frame to a signal energy of a preceding frame in the series of frames.

4. The method of claim 3, further comprising determining an end time of the tone in the signal based on the comparison of the signal energies of the last frame and the preceding frame.

5. The method of claim 4, further comprising determining a duration of the tone based on the determined start time and end time of the tone in the signal.

6. The method of claim 1, wherein comparing the signal energy of the first frame to a signal energy of a subsequent frame in the series of frames comprises determining a ratio of the signal energy of the first frame to a signal energy of a subsequent frame in the series of frames.

7. The method of claim 6, wherein determining a start time of the tone in the signal based on the comparison of the signal energies of the first frame and the subsequent frame comprises multiplying the ratio of the signal energy of the first frame to the signal energy of a subsequent frame in the series of frames by the frame rate to determine the duration of the tone in the first frame.

8. The method of claim 6, wherein determining a start time of the tone in the signal based on the comparison of the signal energies of the first frame and the subsequent frame comprises using the ratio of the signal energy of the first frame to the signal energy of a subsequent frame in the series of frames to perform a table lookup that maps energy ratios to time duration.

9. An apparatus comprising:
   a tone detection element to detect the presence of a tone in a signal in frames of a Voice Over Internet Protocol communication, wherein the signal is represented in a series of frames, wherein the series of frames has a frame rate of a voice codec and the tone has an associated energy and frequency, and to determine a signal energy of each frame in the series; and
   a tone analyzing element coupled to the tone detection element to compare the energy and the frequency of the tone in a selected frame to one or more templates of energies and frequencies of possible tones, to analyze an immediately previous frame to locate a first frame in the series of frames in which there is at least a partial tone in response to the comparison indicating a possible tone in the selected frame compare the signal energy of a first frame in the series in which there is at least a partial tone to the signal energy of a full tone frame to estimate a time duration of the tone in the first frame and to determine a start time of the tone in the signal based on the comparison of the signal energies of the first frame and the full tone frame.

10. The apparatus of claim 9, further comprising a voice encoder coupled to the tone detection element to encode voice signals.

11. The apparatus of claim 9, further comprising a tone encoder coupled to the tone analyzing element to encode tone signals.

12. The apparatus of claim 9, wherein the tone analyzing element to compare the signal energy of the first frame in the series in which there is at least a partial tone to the signal energy of a full tone frame and to determine a start time of the tone in the signal based on the comparison of the signal energies of the first frame and the full tone frame comprises the tone analyzing element to compare the signal energy of the first frame in the series in which there is at least a partial tone to the signal energy of a frame subsequent to the first frame in the series and to determine a start time of the tone in the signal based on the comparison of the signal energies of the first frame and the subsequent frame.

13. The apparatus of claim 9, wherein the tone analyzing element to further compare the signal energy of a last frame in the series in which there is at least a partial tone to the signal energy of a full tone frame and to determine the end time of the tone in the signal based on the comparison of the signal energies of the last frame and the full tone frame.

14. The apparatus of claim 13, wherein the tone analyzing element to further determine a duration of the tone based on the determined start time and end time of the tone in the signal.

15. The apparatus of claim 13, wherein the tone analyzing element to compare the signal energy of the last frame in the series in which there is at least a partial tone to the signal energy of a full tone frame and to determine the end time of the tone in the signal based on the comparison of the signal energies of the last frame and the full tone frame comprises the tone analyzing element to compare the signal energy of the last frame in the series in which there is at least a partial tone to the signal energy of a frame preceding the last frame in the series and to determine the end time of the tone in the signal based on the comparison of the signal energies of the last frame and the preceding frame.

16. An article of manufacture comprising:
    a machine accessible medium including content that when accessed by a machine causes the machine to perform operations comprising:
    receiving a series of Voice Over Internet Protocol frames having a signal containing a tone, wherein the series of frames has a frame rate of a voice codec and the tone has an associated energy and frequency;

comparing the energy and the frequency of the tone in a selected frame to one or more templates of energies and frequencies of possible tones;

analyzing an immediately previous frame to locate a first frame in the series of frames in which there is at least a partial tone in response to the comparison indicating a possible tone in the selected frame;

comparing the signal energy of the immediately previous frame in which there is at least a partial tone to a signal energy of the selected frame in the series of frames to estimate a time duration of the tone in the first frame; and determining a start time of the tone in the signal based on the comparison of the signal energies of the first frame and the full tone frame.

17. The article of manufacture of claim 16, wherein the machine-accessible medium further includes content that causes the machine to perform operations comprising locating a last frame in the series of frames that contains at least a partial tone.

18. The article of manufacture of claim 17, wherein the machine-accessible medium further includes content that causes the machine to perform operations comprising comparing the signal energy of the last frame to a signal energy of a full tone frame.

19. The article of manufacture of claim 18, wherein the machine-accessible medium further includes content that causes the machine to perform operations comprising determining an end time of the tone in the signal based on the comparison of the signal energies of the last frame and the full tone frame.

20. The article of manufacture of claim 19, wherein the machine accessible medium including content that when accessed by the machine causes the machine to perform operations comprising comparing the signal energy of the last frame to a signal energy of a full tone frame and determining an end time of the tone in the signal based on the comparison of the signal energies of the last frame and the full tone frame comprises the machine accessible medium including content that when accessed by the machine causes the machine to perform operations comprising comparing the signal energy of the last frame to a signal energy of a frame preceding the last frame in the series of frames and determining an end time of the tone in the signal based on the comparison of the signal energies of the last frame and the preceding frame.

21. The article of manufacture of claim 19, wherein the machine-accessible medium further includes content that causes the machine to perform operations comprising determining a duration of the tone based on the determined start time and end time of the tone in the signal.

22. The article of manufacture of claim 16, wherein the machine accessible medium including content that when accessed by the machine causes the machine to perform operations comprising comparing the signal energy of the first frame that contains at least a partial tone to a signal energy of a full tone frame and determining a start time of the tone in the signal based on the comparison of the signal energies of the first frame and the full tone frame comprises the machine accessible medium including content that when accessed by the machine causes the machine to perform operations comprising comparing the signal energy of the first frame that contains at least a partial tone to a signal energy of a frame subsequent to the first frame in the series of frames and determining a start time of the tone in the signal based on the comparison of the signal energies of the first frame and the subsequent frame.

* * * * *